Sept. 3, 1968     W. G. BAULE     3,399,749
FLEXIBLE RESILIENT BRAKE BAND
Filed Oct. 31, 1966     3 Sheets-Sheet 1
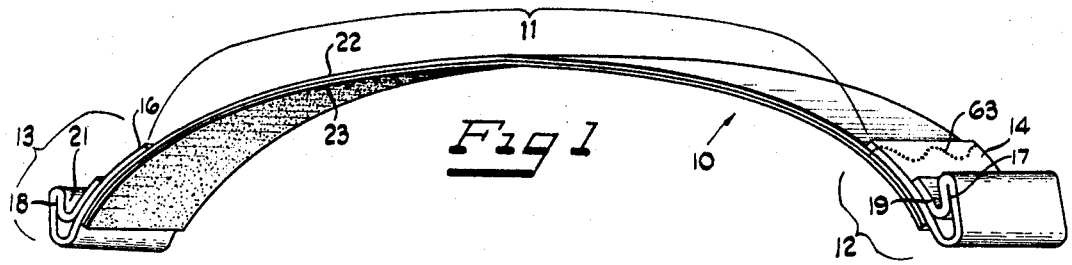
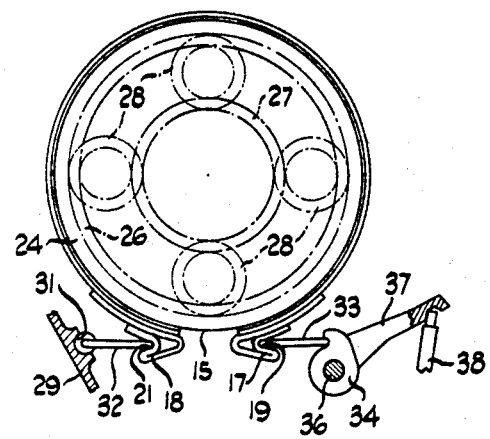
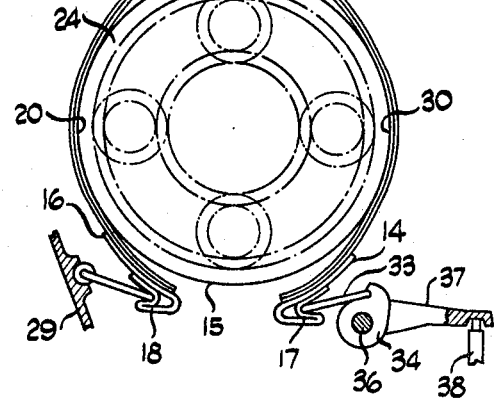
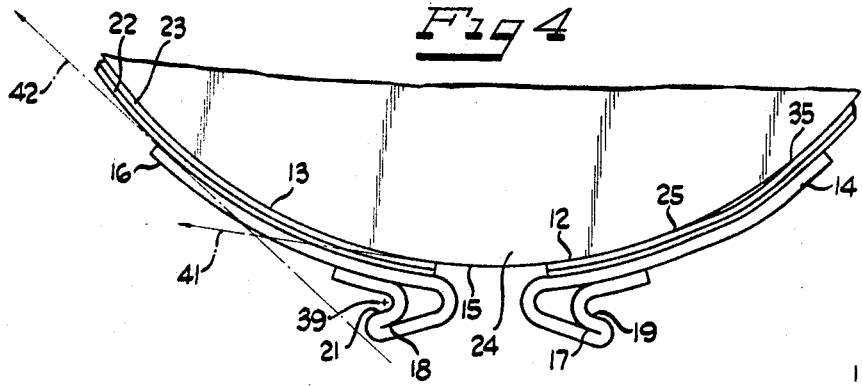
INVENTOR
WERNER G. BAULE
BY Herman E. Smith
ATTORNEY Sept. 3, 1968 W. G. BAULE 3,399,749
FLEXIBLE RESILIENT BRAKE BAND
Filed Oct. 31, 1966 3 Sheets-Sheet 2
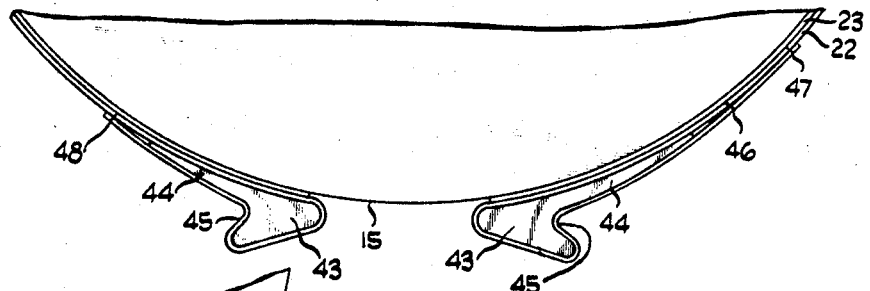
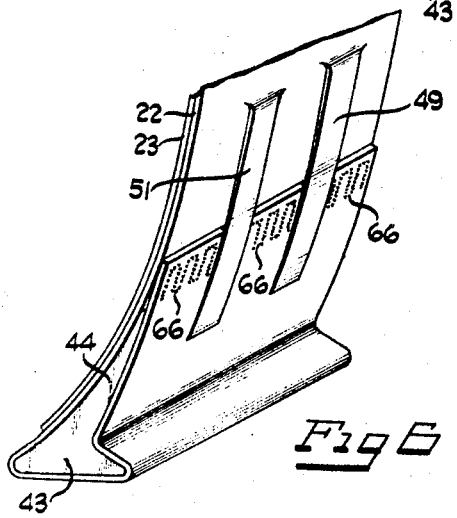
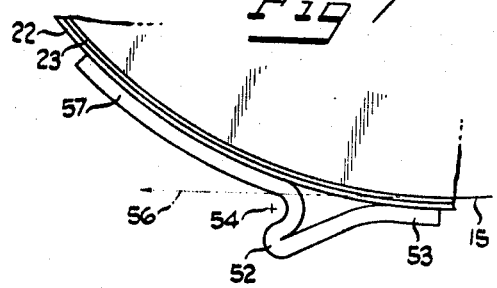
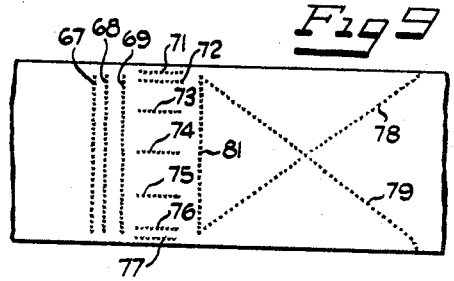
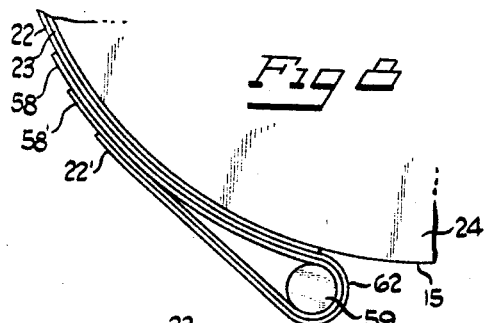
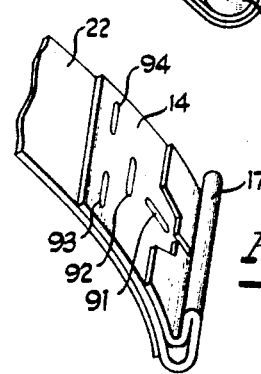
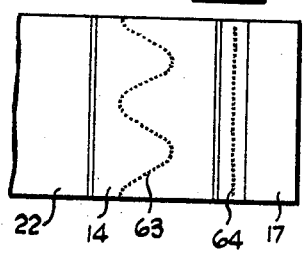
INVENTOR
WERNER G. BAULE
BY Herman E. Smith
ATTORNEY Sept. 3, 1968 W. G. BAULE 3,399,749
FLEXIBLE RESILIENT BRAKE BAND
Filed Oct. 31, 1966 3 Sheets-Sheet 3
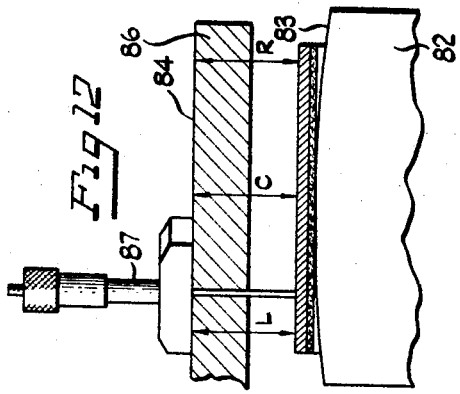
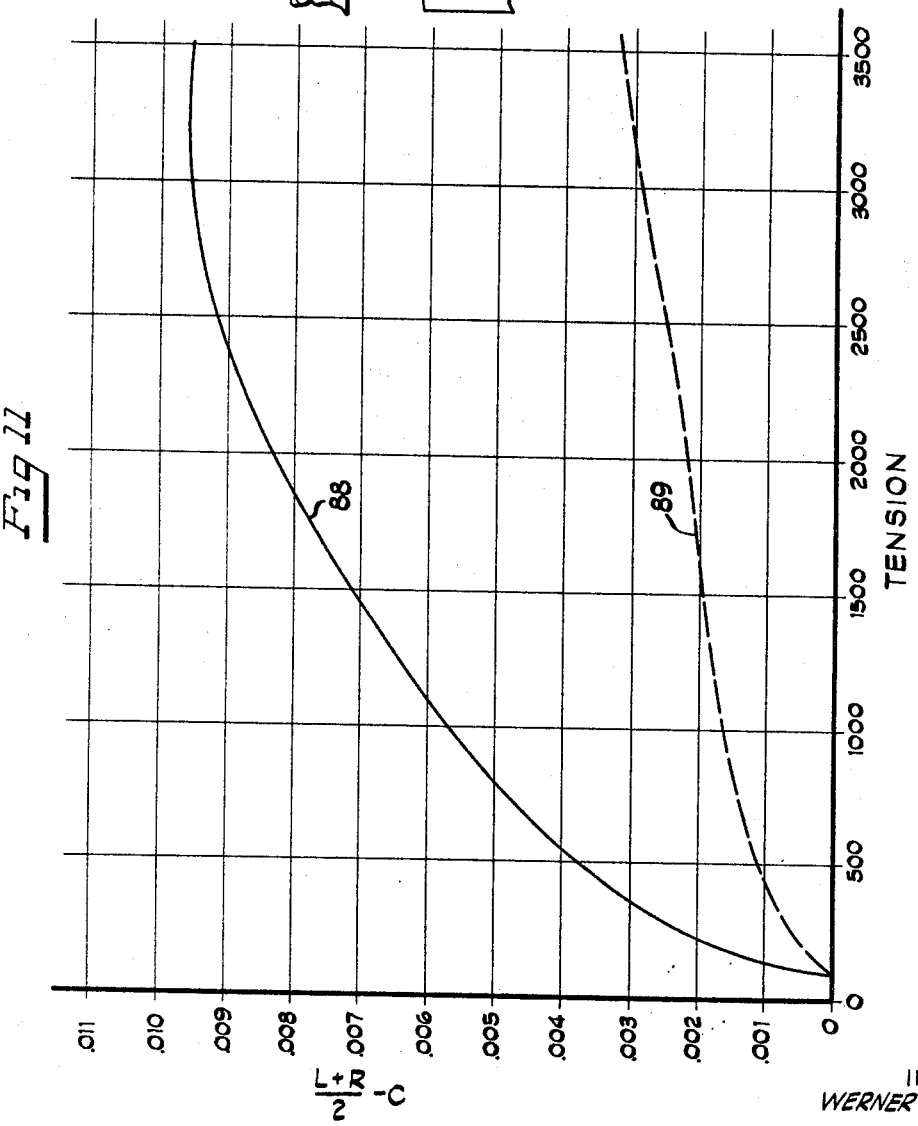
INVENTOR
WERNER G. BAULE
BY Herman E. Smith
ATTORNEY

United States Patent Office 3,399,749
Patented Sept. 3, 1968

3,399,749
FLEXIBLE RESILIENT BRAKE BAND
Werner G. Baule, Arlington Heights, Ill., assignor to Borg-Warner Corporation, Chicago, Ill., a corporation of Illinois
Filed Oct. 31, 1966, Ser. No. 590,769
12 Claims. (Cl. 188—259)

ABSTRACT OF THE DISCLOSURE

A brake band of the strap type is provided with zones having different combinations of flexibility and resilience along the length thereof. The midportion of the band is exceptionally flexible for compliance with a braking surface, while an end zone is relatively more resilient, providing an internal bias for separation of the band from the braking surface in the absence of an apply force.

---

The present invention relates generally to a band brake and more particularly to an improved brake band for use in effecting speed changes in a planetary type transmission, such use involves locking a planetary reaction member against rotation with respect to the gear case.

A principal benefit desired in braking structures is the achievement of maximum contact between the surfaces of the braking members. This involves both making use of as much surface as possible, and achieving maximum conformability between the surfaces. The problem becomes particularly acute in providing shifting bands for present-day automatic transmissions for automotive vehicles, where it is necessary to provide precise control of high torque members in a small space within short time intervals.

Heretofore, automatic transmissions have been provided with bands which encircled a cylindrical drum-like surface of a planetary gearing reaction member. Structurally, these bands have been of the curved beam type which are sprung into clamping engagement with the peripheral surface of the drum responsive to a tangential actuating or "apply" force. Although this prior type of brake band has been widely used in automobiles, it includes several shortcomings which the present invention overcomes.

One approach to providing for surface conformation between the braking members, is to manufacture both the drum and the band to exacting manufacturing tolerances. For example, the drum is manufactured with a predetermined cylindrical dimension. The band is manufactured as a tubular closed loop member having an internal diameter less than the external diameter of the drum. The band is then subjected to physical distortion or deformation such as by stretch forming to a predetermined size and shape, which for example may have a complex mathematical curvature such as a cardiod. A transverse cut is then made in the band hoop and the ends of the band are allowed to assume a free form spaced apart position which is determined, at least in part, by the stresses imposed on the band during the stretch-forming operation. In this condition, the band has internal dimensions greater than the diameter of the drum and thus can be positioned about the exterior thereof. Thereafter, when an actuating force is applied to the ends of the band, forcing the ends toward each other, the band will bend as a curved beam into a circular configuration conforming itself to the periphery of the drum. It is apparent that such a manufacturing process is complex, costly, and time consuming. Less obvious is the fact that the forces employed in stretch-forming the band set up transverse stress and strain gradients from the middle of the band to each side edge thereof. These stress-strain gradients cause the band to assume a convex transverse cross sectional configuration which is commonly referred to as "cambering." Thus, when the band is actuated to grip the drum, the midportion first engages the drum periphery, after which the band must be further tightened to draw down the lateral edges thereof into contact with the drum surface. In order to relieve this condition, a central circumferential groove is often provided on the interior surface of the band providing a measure of relief so that the apply forces will more readily draw the band margins into contact with the drum surface.

A still further difficulty with this prior type of band, called "mismatching," is believed to result from residual stresses trapped in the band material prior to the stretch forming operation, as well as from stresses created in the end portions of the band as a result of attaching the actuator fittings thereto. When "mismatching" is present, the free ends of the band may spring axially to form a generally helically shaped band, or may spring radially to a free form, other than the precalculated one. When a band has axially mismatched ends in the relaxed condition, it does not necessarily conform to a helix when tightened against a cylindrical drum surface. Instead, the band ends are urged toward parallelism with the drum axis by the anchoring and actuator fittings with the result that certain edge portions of the band tightly engage the drum surface while alternate edge portions are out of contact with the drum surface. The portion of the band friction surface adjacent the tight edge portions of the band are accordingly subjected to extremely high localized wear while the surface portions adjacent the loose edge portions have little or no frictional contact with the drum surface. Thus, upon application of the band engaging force, a band affected by either axial or radial mismatching may not conform satisfactorily to the surface of the drum, or in the alternative may require an excessive force to make it conform properly with the drum surface.

When these problems of band construction are considered together with the ordinary dimensional tolerances of drum manufacturing, it becomes clear that unless considerable care and precision are exercised during manufacturing, full use of the braking surfaces cannot be expected.

The improved brake band of the present invention provides for a high degree of conformability between the braking surfaces while minimizing the problems of precise sizing, cambering and mismatching. This improved conformability of the band end portions enhances the self-energizing properties of the band such that the band is permitted to reliably grip the drum surface responsive to a wider range of application forces, thereby improving performance.

Self-energizing occurs when initial contact between a portion of the band and the drum develops sufficient friction to pull the band around the drum. As the band is pulled around the drum, it is pulled more tightly against the drum surface further increasing the friction which further increases the tension and so on until sufficient friction is developed to hold the drum against rotation. It is thus seen that the application force need only initiate the self-energizing action and can be independent of the forces acting between the band and drum.

A principal feature of the present invention is the provision of a unitary band structure having a limber intermediate zone portion which is readily flexible in both the crosswise and longitudinal directions in combination with somewhat stiffer, yet flexible terminal bone portions, thus providing improved conformability between the brake band and brake drum surfaces.

A further feature of the invention is the provision of preselected areas or zones of graduated flexibility and resiliency along the length of the band.

A still further feature of the invention resides in the provision of preformed flexible resilient terminal zone portions.

Another feature of the invention is the provision of a brake band exhibiting improved parallelism of its end connectors.

An additional feature of the invention resides in the pattern of bonding thin flexible strips to each other for providing a laminated brake band structure facilitating the incorporation of predetermined improved properties of flexibility and resilience therein in both the longitudinal and transverse directions.

Other advantages of the present invention will become apparent from the following description together with the drawings.

In the drawings:

FIGURE 1 is a perspective view of a brake band according to the present invention;

FIGURE 2 is an environmental view, with portions shown schematically, illustrating a typical operating or engaged condition for the brake band of the present invention;

FIGURE 3 is a view similar to FIGURE 2 showing the band in relaxed or disengaged condition;

FIGURE 4 is an enlarged fragmentary view showing the end connectors in greater detail;

FIGURE 5 is a view similar to FIGURE 3 showing an alternate form of end connector construction;

FIGURE 6 is a fragmentary perspective view showing a further modification of the construction shown in FIGURE 5;

FIGURE 7 is a view similar to FIGURE 4 showing a modified form of end connector;

FIGURE 8 is a fragmentary view of a still further modification of the band and end connector;

FIGURE 9 is a fragmentary view of the band, illustrating various welding patterns for controlling flexibility in portions of the band;

FIGURE 10 is a fragmentary view showing a weld pattern for securing an end connector to the band structure;

FIGURE 10A is a fragmentary view showing an end connector secured to the band structure by means of a pattern of projection welds;

FIGURE 11 is a graph showing the improved transverse flexibility of the band according to the present invention; and FIGURE 12 is a fragmentary view of testing apparatus for evaluating the transverse flexibility of the brake band.

Referring now, in greater detail, to the drawings, and more particularly to FIGURE 1 thereof, the reference character 10 generally indicates an elongated flexible brake band according to the present invention. The intermediate zone portion 11 of the band structure is of a relatively limber construction, such that it may assume a variety of shapes, from flat or nearly flat to a somewhat arched curvature. This limber construction is beneficial in packing, storing, and installing the band. However, the primary benefit of the limber intermediate zone 11 is that it provides for both longitudinal and transverse conformability with the surface 15 of a brake drum and permits the ends of the band to be brought into alignment with each other. Each of the terminal zone portions 12 and 13 is provided with a backing strip 14 and 16 which may assume a variety of shapes, to be more fully described hereinafter.

As shown in FIGURE 1, the backing strips 14 and 16 are of a stiffer construction than the intermediate portion of the band, but still are flexible in the wrapping direction, providing for circumferential conformability with the surface 15 of the cylindrical brake drum.

A portion of the flexible backing strip may be folded upon itself in such configuration as to provide relatively rigid end connectors 17 and 18 having sockets 19 and 21 therein for reception of portions of the tensioning mechanism. As shown in FIGURE 1, the band includes a layer of thin sheet metal 22, extending continuously throughout the intermediate and terminal zone portions thereof, having a similarly extending layer of thin fibrous, frictional material 23 bonded thereto. The sheet metal layer 22 and friction material layer 23 may be bonded to each other in either the flat condition or while curved to provide a preformed laminated structure having a predetermined degree of springiness.

The backing strips 14 and 16 are preferably secured to the sheet metal layer 22 by a high energy welding process such as "electron beam welding" in order to form a permanent unitary construction. The frictional material 23 is preferably of a material known as "paper friction facing" which has porous properties for breaking down lubricant film which might become entrapped between the braking surfaces in an oily environment such as a transmission housing. An example of a suitable friction facing material is described in U.S. Patent No. 3,270,846.

Referring now to FIGURE 2, the band structure 10 is shown in engagement with a brake drum 24 forming a planetary gearing reaction member of a transmission. Brake drum 24 is integral with the ring gear portion 26 of a planetary gear set which includes a sun gear 27 and planetary gears 28. A portion of transmission housing 29 is provided with an anchorage socket 31 for pivotally seating an anchorage strut 32. The socket 21 of end connector 18 bears on the other end of anchorage strut 32. The socket 19 of the other end connector 17 bears on apply strut 33 which in turn bears against a portion of apply lever 34. Pin 36 serves to pivotally ground lever 34 with respect to transmission housing 29. Apply lever 34 includes a longer arm 37 which bears against a link 38 extending from a portion of the actuating mechanism (not shown in the drawings) such as a hydraulic piston and cylinder. Thus, fluid pressure generated by the engine may be used to pivot the apply lever 34 which in turn tensions band 10. The lever, struts, and anchorage are conventional components of an automatic transmission, and are ordinarily used for deflecting the conventional curved bear type of brake into clamping engagement with the planetary reaction drum member 24. Thus although the band structure of the present invention is drawn against the drum by tension applied to its ends, it is compatible with transmissions equipped for clamping actuation of the curved beam type of brake.

The relaxed profile assumed by the band structure when tension is released is illustrated in FIGURE 3. Here it is seen that the band structure tends to engage the drum member 24 at two places, 20 and 30 spaced approximately 180° apart while the midportion of the band and both terminal zone portions are out of contact with the drum periphery 15. This is distinguished from the prior art curved beam type band which rides at one place on the top of the drum member when disengaged. Herein resides an important advantage of the present invention which may not be immediately recognized. Inasmuch as the apply linkage including strut 33 and lever 34, is uni-directional in operation, that is, the linkage tensions the band but does not pull it away from the drum, the band structure must store sufficient energy to spring away from drum surface 15 when the apply force is released. In the prior curved beam type of band, the point of inflection is at the top of the drum, approximately one-half way around the circumference of the drum from the end connectors. The prior device thus requires a relatively stiff band construction in order to provide adequate "spring back" over a length measured from the point of inflection to a band end connector. In the band of the present invention, points of inflection 20 and 30, occur at less than 90° from respective end connector portions 17 and 18. Further, the portion of the band effective in producing spring-back extends from the point of inflection 20 or 30 to the end of the backing strip 14 or 16 and amounts to an arc-length of approximately 45°. The effective flexural length of the band of the present invention is thus reduced to about one-fourth of the corresponding flexural length of the prior art band making possible the use of thin highly conformable band material without a corresponding sacrifice of spring-back properties.

The terminal zone portions 12 and 13 of band 10 are shown in more detail in FIGURE 4. Socket portion 21 of connector 18 includes a virtual pivot 39 about which the connector 18 and strut 32 are free to rock with respect to each other. The frictional force indicated by arrow 41 tends to rock the end connector counterclockwise about virtual pivot 39. However, the band tension, indicated by arrow 42, acts along a line of action passing on the opposite side of virtual pivot 39, and tends to rock the end connectors in the clockwise direction. It is seen from an inspection of FIGURE 4 that if the end portion 13 of the band is of stiff, unyielding construction, it may rock on the surface 15 of the drum 24, responding alternately to the moments of the friction and tension forces, unless the band surface is in close conformity with the drum surface. Such a situation may result in a cyclic fluttering condition known as "chattering" which in turn, may interfere with the smooth response of the band. In addition, "chattering" may result in premature fatigue failure of the band. Although terminal zone portion 13 is provided with backing strip 16, the combination remains flexibly yieldable in order to conform with the drum surface responsive to band tension, thus minimizing the problem of "chatter." While backing strip 16 is shown as having uniform thickness, its thickness may be varied, such as by tapering, to provide predetermined properties of flexibility along its length. Alternatively, the backing strip may be varied in width or provided with various patterns of cutouts to control its flexibility with more precision.

A further feature, which may be incorporated in the terminal zone portion of the band, is illustrated by end portion 12 shown on the right hand side of FIGURE 4. The greater thickness of backing strip 14 together with its laminated junction with the sheet metal layer of the band provides means for pre-forming the band end portion. End portion 12 as shown in its untensioned state in FIGURE 4, has a relaxed curvature slightly concave with respect to the drum periphery 15. Such curvature may be of catenary configuration having points of tangency 25, 35 with the drum periphery. When the band is tensioned, end portion 12, being flexible, will be conformed with drum periphery 15 like end portion 13, but when the tension force is relaxed, will return to its concave shape, breaking away from the drum surface 15. This break away action is effective to annul or counteract the self-energizing properties of the band so that the entire band is free to separate from the drum surface when the apply force is relaxed. Preferably, terminal zone portions 12 and 13 are of symmetrical construction for simplicity of installation. However, in some circumstances it may be desirable to provide an asymmetrical construction to take full advantage of the variation in tension forces, which may become twice as great at the anchorage end 18 as at the apply end 17.

In view of the difficulty encountered in accurately representing the thickness of the band in scale drawings, the following example of a band structure, preferred for use in automatic transmissions of automobiles, is included for purposes of clarity and completeness. Where the drum 24 is 7.030 inches in diameter, the metal strip 22 is preferably 21.455 inches long, either 1.75 or 2.25 inches wide, and .02 inch thick. The material for strip 22 is preferably type #302 stainless steel. The friction facing material 23 is generally coextensive with the length and width of the strip 22 and preferably .03 inch thick. An end connector such as 18 and its backing strip 16 may be formed of a soft cold rolled steel such as S.A.E. 1010 having a thickness of approximately .080 inch. The above specifications are taken from a particular sample of the invention and may be varied as to dimensions and materials in accordance with operating conditions. In varying these dimensions, care should be exercised to assure that the band and particularly the backing strips thereof are not subject to strain beyond their elastic limit by the tension forces imposed thereon. Straining beyond the elastic limit results in strain hardened permanent deformations which hinder full conformability of the band with the drum surface.

In the alternate form of end construction shown in FIGURE 5, a cast or extruded insert 43 includes a thick unyieldable socket portion 45 merging into a thinner backing portion 44. The sheet metal layer 22 is looped about the insert 43 and secured to itself as at 46, 47, or 48 to form a laminated terminal zone portion. The laminated construction may be terminated closely adjacent the tapered end of insert 43 as at 48 or may be extended toward the point of inflection as at 46, 47 to provide increased spring-back properties.

A further modification of the embodiment of FIGURE 5 is shown in FIGURE 6. The sheet metal layer 22 is provided with a pair of ribs or ridges 49, 51 extending from the end toward the point of inflection. These ribs may be provided by rolling or stamping grooves in the inside surface of the sheet metal layer 22. They may be varied in number, length, width, or depth, to provide the desired spring-back properties. Insert 43 may be provided with channels which interlock with ribs 49, 51 for securing the insert against axial separation from the band.

A further modification of the end connector and backing strip is shown in FIGURE 7. This modified end connector 52 has a toe portion 53 extending into the gap between end connectors providing for fuller circumferential contact with the drum surface 15. The construction shown in FIGURE 7 is more flexible than the construction shown in FIGURE 4, thereby providing for better surface conformance. Additionally, this construction locates the virtual pivot 54 closer to the line of action of the friction force (indicated by arrow 56). Closer proximity of the virtual pivot with the line of action 56 of the friction force reduces the counterclockwise moments thereby further reducing any tendency to "chatter." The backing strip 57 of connector 52 may be concavely preformed or varied in width, thickness, or section modulus as described in connection with backing strips 14 and 16.

The alternate embodiment shown in FIGURE 8 illustrates a form of laminated construction having multiple layers of sheet metal. For example, the sheet metal layer 22 may be reinforced by a similar reinforcing strip 58, the two strips being looped about the pin 59 and having portions 58' and 22' extending back to form a multiple layered lamination with the strips 22 and 58. Reinforcing strip 58, 58' and the reversely extending strip portion 22' provide for gradual variations of flexibility and resilience along the length of the band. While the terminal portions of strips 58, 58' and 22' are shown grouped closely together in FIGURE 8, they may be shifted to other selected positions along the length of the band to provide the desired combination of flexibility and resiliency at particular locations. While a single reinforcing strip 58 has been shown, additional reinforcing strips may be included for greater latitude in the available combinations of flexibility and resiliency.

The end construction shown in FIGURE 8 is more flexible than the construction shown in FIGURES 4 through 7 and therefore results in greater conformance with the drum surface 15. As a result of greater surface conformance, the self-energizing property of the band is increased, and may approach a critical value where the band becomes engaged with the drum too quickly. The rounded end portion 62 of strip 22 allows the rotating drum 24 to carry oil between friction facing 23 and drum surface 15 thereby counteracting the tendency to engage too quickly.

The self-energizing property of the band end portion can be controlled by controlling the flexibility of the end portion through the use of welding for bonding the strips to each other in a laminated structure as described below.

In either the laminated sheet or backing strip construction, the members may be secured to each other by high energy welding processes, sometimes called "electron beam welding." Among the advantages of such welding is the precise control of width and depth of the weld bead. Such precise control affords an opportunity to eliminate the problem of high spots in the inner surface of the band structure. The elimination of high spots in the inner surface of the band promotes smooth engagement of the band with the drum, and permits the use of a thin, oil absorbent friction facing.

Another satisfactory welding technique for securing the band structure together is known as projection welding. As shown in FIGURE 10A, backing strip 14 is coined to provide a pattern of dimples 91, 92, 93, 94 on the top side, resulting in a similar patterns of projections on the underneath side for contacting the sheet metal strip 22. The backing strip and sheet metal are then secured to each other by fusion in the vicinity of the projections.

Another benefit of welding is the selective control of flexibility afforded by various patterns of weld beads as illustrated in several figures of the drawings. For example, a preferred general purpose weld pattern is the serpentine weld bead 63 as shown in FIGURES 1 and 10. This serpentine configuration is advantageous in that it provides a large area of contact distributed longitudinally and transversely over the band. The length of the weld bead can be varied to provide the desired strength, while the distribution can be varied longitudinally and transversely to provide the desired stiffness in the laminations of the strips.

A variation of the serpentine pattern of welding is indicated by the beads 66 shown in FIGURE 7. Here the length and spacing of the longitudinal and transverse portions of the bead may be selected to provide a high degree of longitudinal stiffness while preserving transverse flexibility.

Other desirable patterns of welds are shown in FIGURE 9 for convenience in illustration. For example, a series of transverse welds 67, 68, 69 may be spaced from each other along the length of the band structure to provide transverse stiffness and longitudinal flexibility, as desired. In a similar way longitudinal welds 71 through 77 may be spaced across the width of the band structure to provide for transverse flexibility and longitudinal stiffness as desired. Where space permits, angular welds such as 78, 79 or combinations of angular welds and transverse welds such as 81 may be used to control both longitudinal and transverse stiffness.

Where control of stiffness is not a critical factor such as in securing the connector end portion 17 to itself, a straight transverse weld bead 64 may be used effectively.

Referring now to FIGURES 11 and 12 there is shown a graph indicating the transverse flexibility of the present brake band and an apparatus for measuring transverse flexibility. In the graph of FIGURE 11, the horizontal scale indicates the actuating force applied to the ends of the band in pounds, while the vertical scale indicates radial deflection of the band edges in inches. Transverse deflection of the band edges is measured in the apparatus shown in FIGURE 12 where a drum member 82, having a slightly crowned surface 83, is fixedly mounted with respect to the planar surface 84 of reference bar 86. A band to be tested is placed upon the drum member 82 and the dimensions L, C and R are read by means of the micrometer 87 at various values of actuating force. The dimensions L and R are averaged and subtracted from dimension C to arrive at the values of transverse flexibility represented by the vertical scale of FIGURE 11. Solid line curve 88 represents the transverse flexibility of the band of the present invention as a function of the actuating force. The transverse flexibility of a commercially interchangeable brake band according to the prior art is indicated by the broken line curve 89 for purposes of comparison.

What is claimed is:

1. An elongated brake band structure adapted for wrapping about a portion of the outer peripheral surface of a brake drum, said band structure providing improved response to the application and release of an actuating force, said band structure including means defining connector members located adjacent respective terminal portions thereof for receiving said actuating force; wherein the improvement resides in providing said band structure with a relatively limber zone intermediate the ends thereof merging into a pair of relatively resilient terminal zones extending inwardly from respective ends thereof, said intermediate zone being flexible in both the transverse and longitudinal dimensions thereof for permitting both transverse and circumferential compliance with said drum surface responsive to the application of said actuating force thereto in the longitudinal direction, and at least one of said resilient terminal zones being internally biased in the unwrapping direction for urging said intermediate zone of the band structure away from said drum surface responsive to release of said actuating force.

2. The invention according to claim 1 wherein said band includes at least one flexible resilient end portion having a relaxed curvature closely matching the curvature of a peripheral portion of said cooperating brake drum, said end portion being yieldably conformable to the periphery of said cooperating drum responsive to the application of said actuating force to said band through the end connector thereof.

3. The invention according to claim 2 wherein said one flexible resilient end portion of said band is provided with a relaxed curvature slightly concave with respect to the curvature of the periphery of said cooperating brake drum when in the relaxed position, and being deflectable into conformity with the said peripheral drum portion responsive to the application of an actuating force to said connector member.

4. The invention according to claim 3 wherein the relaxed curvature of said concave end portion is in substantial conformity with a catenary curve having points of tangency with the curvature of a peripheral portion of the said cooperating drum when in the relaxed position, and being deflectable into conformity with the said peripheral drum portion responsive to the application of an actuating force to said connector member.

5. The invention according to claim 1 wherein said band includes layers of thin sheet metal and thin fibrous friction material bonded to each other, said layers providing means for imparting a preselected degree of resiliency to said intermediate zone of said band.

6. The invention according to claim 5 wherein the layer of thin sheet metal includes a ridge extending longitudinally inwardly from an end of said band providing increased stiffness for an end portion thereof.

7. The invention according to claim 5 wherein at least one end portion of said band includes a backing strip overlapping an end portion of said sheet metal layer, said backing strip having a relatively inflexible portion providing a band connector member merging with a relatively more flexible portion conforming an end portion of said layers to a preselected curvature.

8. The invention according to claim 5 wherein at least one end portion of said band includes a backing member engaged with an end portion of said sheet metal layer, said backing strip having a relatively inflexible portion providing a connector member merging with a relatively more flexible portion conforming an end portion of said layers to a preselected curvature, the relatively more flexible portion of said backing strip progressively increasing in flexibility inwardly from the end of said band.

9. The invention according to claim 5 wherein at least one end portion of said band includes a backing member providing a connector member for said band, the sheet metal layer being looped about said backing member.

10. The invention according to claim 5 wherein an end portion of said sheet metal layer is looped about a connector member and secured to itself imparting a preselected degree of resilience to the end portion of the band.

11. The invention according to claim 5 wherein an additional layer of metal is secured to said sheet metal layer by means of preselected patterns of welded seams to provide a bowed laminated structure having preselected properties of flexibiilty and resilience in selected portions thereof, said weld seams extending across said band for increasing the transverse resilience thereof and extending along a portion of said band for increasing resilience thereof in the longitudinal direction.

12. An elongated brake band adapted to embrace a portion of the outer peripheral surface of a cooperating brake drum, said band exhibiting enhanced qualities of co-action with said drum in response to the application and release of an actuating force, said band having connector members adjacent respective end portions thereof for receiving said actuating force, characterized in that selected zones along the length of said band are provided with different combinations of flexibility and resilience, a first zone thereof including a major portion of the length of said band being provided with a relatively low degree of resilience and a high degree of flexibility for furnishing a pliable portion yieldable toward said cooperating drum surface for compliance therewith in response to the application of said actuating force, and a second zone thereof including a minor portion of the length of said band merging with said first zone and disposed adjacent one end of said band, said second zone being provided with relatively less flexibility and greater resilience than said first zone and including a resilient internal separating bias, urging said second zone portion away from said cooperating drum surface in response to the release of said actuating force.

References Cited

UNITED STATES PATENTS

| | | | |
|---|---|---|---|
| 1,395,670 | 11/1921 | Edell | 188—249 |
| 1,602,002 | 10/1926 | Dominguez | 188—249 |
| 1,736,913 | 11/1929 | Harry et al. | 188—259 |
| 2,692,663 | 10/1954 | Reed et al. | 188—259 |
| 3,367,466 | 2/1968 | Lang | 192—107 |

FOREIGN PATENTS 47,023   2/1909   Switzerland.

FERGUS S. MIDDLETON, *Primary Examiner.*

GEORGE E. A. HALVOSA, *Assistant Examiner.*